United States Patent
Yamaguchi

(10) Patent No.: US 7,164,642 B2
(45) Date of Patent: Jan. 16, 2007

(54) OPTICAL DISK REPRODUCING APPARATUS AND METHOD FOR CONTROLLING SPINDLE MOTOR

(75) Inventor: Takahiro Yamaguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 575 days.

(21) Appl. No.: 10/699,345

(22) Filed: Nov. 3, 2003

(65) Prior Publication Data

US 2004/0090891 A1    May 13, 2004

(30) Foreign Application Priority Data

Nov. 6, 2002  (JP) .......................... P2002-322664

(51) Int. Cl.
   *G11B 7/00*    (2006.01)
(52) U.S. Cl. ....................... 369/53.3; 386/80
(58) Field of Classification Search ............... 369/53.3; 386/80
   See application file for complete search history.

(56) References Cited

U.S. PATENT DOCUMENTS 4,737,700 A * 4/1988 Doelves ...................... 318/696
5,311,107 A * 5/1994 Shimegi et al. .............. 318/369
5,990,648 A * 11/1999 Kumar et al. ................ 318/490
6,262,555 B1 * 7/2001 Hammond et al. .......... 318/759

FOREIGN PATENT DOCUMENTS

JP     9-130824    5/1997
JP     9-212998    8/1997

* cited by examiner

*Primary Examiner*—Gautam R. Patel
(74) *Attorney, Agent, or Firm*—Morgan, Lewis & Bockius, LLP

(57) ABSTRACT

In a process of braking an spindle motor, a frequency of a read clock signal synchronized with an RF signal output from an RF amplifier is measured as a first frequency by a braking control circuit. A brake is then applied to the spindle motor for a predetermined time. Thereafter, the frequency of the read clock signal is measured as a second frequency. Next, the braking time is calculated on the basis of: a frequency difference obtained by subtracting the second frequency from the first frequency; the first frequency; and a measuring time from the timing when the first frequency is measured to the timing when the second frequency is measured.

8 Claims, 4 Drawing Sheets

OPTICAL DISK REPRODUCING APPARATUS AND METHOD FOR CONTROLLING SPINDLE MOTOR

BACKGROUND OF THE INVENTION

1. Field of the Invention

The present invention relates to an optical disk reproducing apparatus which reproduces information recorded on an optical disk, and more particularly to an optical disk reproducing apparatus which has a function of calculating a time of supplying a brake signal to a spindle motor for rotating an optical disk. The present invention also relates to a method for controlling a spindle motor in which rotates an optical disk.

2. Description of the Related Art

In a conventional optical disk reproducing apparatus, a spindle motor for rotating an optical disk is controlled in the following manner. A voltage corresponding to a phase difference between a synchronization signal contained in a reproduction signal which is output from an optical pickup in a process of reproducing an optical disk, and a predetermined reference signal is produced with using a PLL (Phase-Locked Loop). The voltage is used as a motor control signal for the spindle motor.

In the case where an optical disk which is in the reproduction state and being rotated is to be stopped, even when the motor control signal for the spindle motor is simply turned off, the optical disk is not immediately stopped because of its inertial force. Therefore, a brake signal for reversely rotating the spindle motor is supplied to the spindle motor to stop the optical disk as early as possible.

An FG (Frequency Generator) sensor which generates a pulse in synchronization with the rotation of the optical disk is disposed to detect whether the optical disk is rotated or not, and detect the number of rotations of the spindle motor. When the rotation of the optical disk is to be stopped, therefore, the time of supplying the brake signal to the spindle motor is determined in accordance with the number of rotations of the spindle motor which is calculated on the basis of an output of the FG sensor. The FG sensor is configured by: a reflection sheet in which optically reflective and absorptive surfaces are alternately arranged on the lower side of a turntable on which the optical disk is placed to be rotated; and a photocoupler consisting of a light emitting device that emits light toward the reflection sheet, and a light receiving element that receives light reflected from the reflection sheet.

In Japanese Patent Publication JP-A-9-212998, a conventional brake control method for a disk player is disclosed. The method described in JP-A-9-212998 is a method that, when a braking operation is to be started, a time to elapse before the number of rotations of a spindle motor is reduced to a predetermined value is measured, and a braking time is determined on the basis of the measured time (See claim 1; column No. 0011; and FIG. 2 of JP-A-9-212998).

In the conventional optical disk reproducing apparatus, the brake signal is supplied to the spindle motor in order to stop the rotation of the optical disk. In order to determine the time of supplying the brake signal, the output of the FG sensor is required, or the FG sensor is necessary. The production cost of the apparatus is correspondingly increased, and miniaturization of the apparatus is inhibited.

In the brake control method described in JP-A-212998, the time to elapse before the number of rotations of the spindle motor is reduced to the predetermined value is measured, and the braking time is determined on the basis of the measured time. In order to detect the number of rotations of the spindle motor, a terminal of outputting a signal for detecting the rotational speed is disposed in the vicinity of the spindle motor. In the brake control method, namely, the rotational speed detection signal output terminal for detecting the number of rotations of the spindle motor is disposed, and, although not shown, an FG sensor which is to be connected to the rotational speed detection signal output terminal is necessary. In the same manner as the conventional optical disk reproducing apparatus, therefore, the production cost of an apparatus is increased by a degree corresponding to the FG sensor, and miniaturization of the apparatus is inhibited.

SUMMARY OF THE INVENTION

It is therefore an object of the invention is to provide an optical disk reproducing apparatus in which the time of supplying a brake signal can be calculated without using an FG sensor, whereby rotation of an optical disk can be stopped.

In order to achieve the object, according to a first aspect of the invention, there is provided an optical disk reproducing apparatus including: a spindle motor configured to rotate an optical disk; an optical pickup configured to emit a laser beam onto the optical disk and to receive light reflected from the optical disk for reproducing information recorded on the optical disk; and a spindle motor controller configured to control the spindle motor on the basis of a synchronization signal contained in a reproduction signal output from the optical pickup in a reproduction process, the apparatus including: a braking control circuit which includes: a first frequency measuring section configured to measure a frequency of a read clock signal that is synchronized with an RF signal corresponding to the reproduction signal, as a first frequency in a process of braking the spindle motor; a first brake signal outputting section configured to output a brake signal for applying a brake to the spindle motor for a predetermined time, after the first frequency is measured; a second frequency measuring section configured to measure the frequency of the read clock signal after the brake is applied for the predetermined time, as a second frequency; a frequency difference determining section configured to determine whether or not a frequency difference obtained by subtracting the second frequency from the first frequency is equal to or larger than a first threshold and equal to or smaller than a second threshold; a braking time calculating section configured to calculate a braking time from an expression of {the first frequency/(the first frequency−the second frequency)}*(a measuring time from a timing when the first frequency is measured to a timing when the second frequency is measured), in a case where determined that the frequency difference is equal to or larger than the first threshold and equal to or smaller than the second threshold; a servo-off section configured to turn off a servo system of the spindle motor, after the braking time is calculated; a second brake signal outputting section configured to output a brake signal to the spindle motor for the calculated braking time, after the servo system is turned off; a first braking voltage setting section configured to set a braking voltage to a higher level and returns a control to a process of the first frequency measuring section, in a case where determined that the frequency difference is smaller than the first threshold; and a second braking voltage setting section configured to set the braking voltage to a lower level and returns the control to the process of the first frequency measuring section, in a case where determined that the frequency difference is larger than the second threshold.

According to a second aspect of the invention, there is provided an optical disk reproducing apparatus including: a spindle motor configured to rotate an optical disk; an optical pickup configured to emit a laser beam onto the optical disk and to receive light reflected from the optical disk for reproducing information recorded on the optical disk; and a spindle motor controller configured to control the spindle motor on the basis of a synchronization signal contained in a reproduction signal output from the optical pickup in a reproduction process, the apparatus including: a braking control circuit configured to measure a frequency of a read clock signal that is synchronized with an RF signal corresponding to the reproduction signal, as a first frequency in a process of braking the spindle motor; to measure the frequency of the read clock signal after a brake is applied to the spindle motor for a predetermined time after the first frequency is measured, as a second frequency; to calculate a braking time on the basis of a frequency difference obtained by subtracting the second frequency from the first frequency, the first frequency and a measuring time from a timing when the first frequency is measured to a timing when the second frequency is measured; and, after the braking time is calculated, to turn off a servo system of the spindle motor and to output a brake signal to the spindle motor for the calculated braking time.

According to a third aspect of the invention, there is provided a method for controlling a spindle motor in which rotates an optical disk, including: measuring a frequency of a read clock signal that is synchronized with an RF signal corresponding to a reproduction signal obtained by reproducing the optical disk, as a first frequency in a process of braking the spindle motor; outputting a brake signal for applying a brake to the spindle motor for a predetermined time, after the first frequency is measured; measuring the frequency of the read clock signal after the brake is applied for the predetermined time, as a second frequency; determining whether or not a frequency difference obtained by subtracting the second frequency from the first frequency is equal to or larger than a first threshold and equal to or smaller than a second threshold; calculating a braking time from an expression of {the first frequency/(the first frequency−the second frequency)}*(a measuring time from a timing when the first frequency is measured to a timing when the second frequency is measured), in a case where determined that the frequency difference is equal to or larger than the first threshold and equal to or smaller than the second threshold; turning off a servo system of the spindle motor, after the braking time is calculated; and outputting the brake signal to the spindle motor for the calculated braking time, after the servo system is turned off.

BRIEF DESCRIPTION OF THE DRAWINGS

The above objects and advantages of the present invention will become more apparent by describing a preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
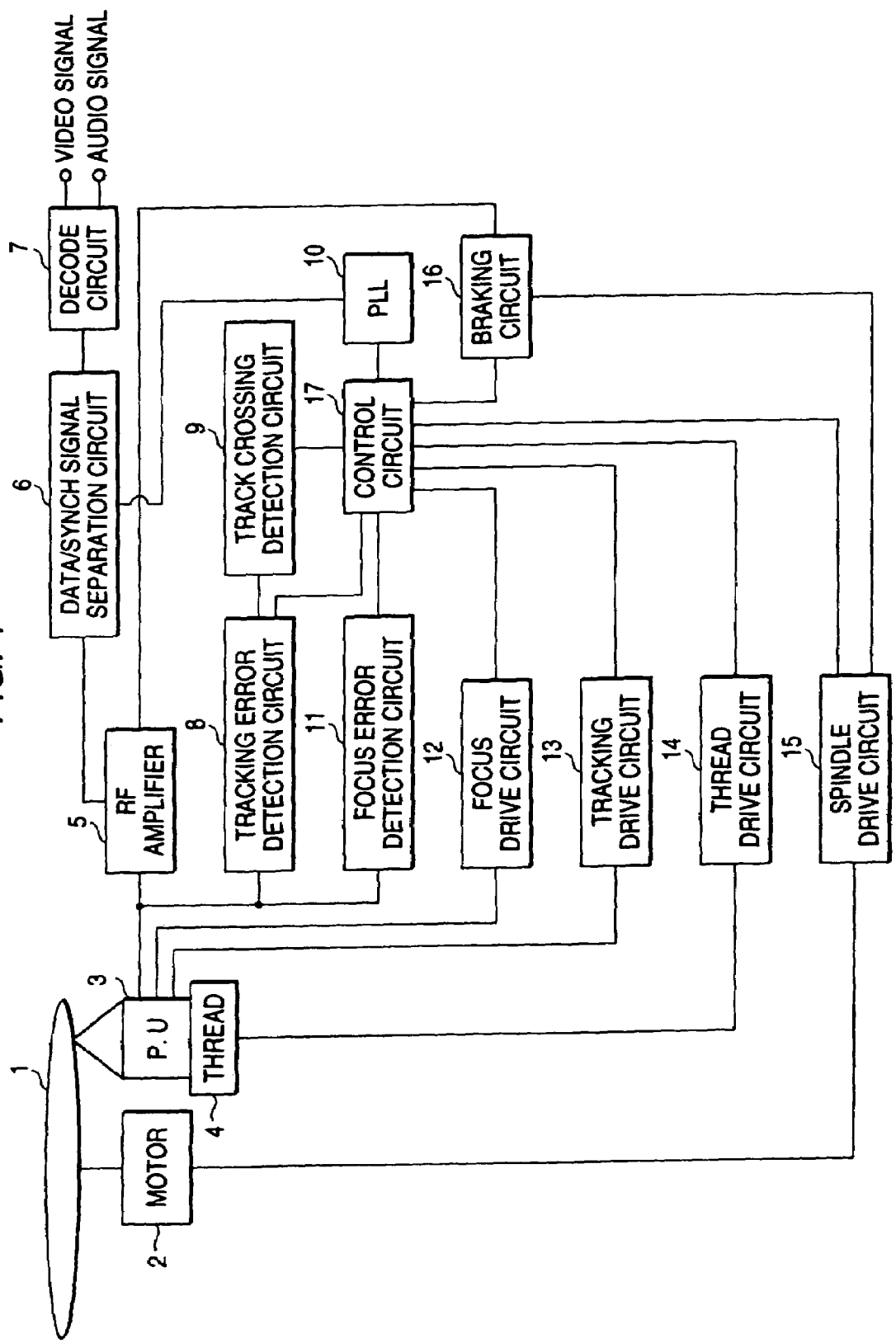
FIG. 1 is a block diagram showing the configuration of an optical disk reproducing apparatus according to an embodiment of the invention.

FIG. 1 is a block diagram showing the configuration of an optical disk reproducing apparatus according to an embodiment of the invention. The optical disk reproducing apparatus includes: an optical pickup 3 which emits a laser beam for reproducing information recorded on an optical disk 1 serving as a recording medium, and which receives light reflected from the optical disk 1; a spindle motor 2 which rotates the optical disk 1; a spindle motor driving circuit 15 which drives the spindle motor 2; a tracking drive circuit 13 which drives an actuator (not shown) for performing a tracking servo control on the optical pickup 3; a focus drive circuit 12 which drives an actuator (not shown) for performing a focus servo control on the optical pickup 3; a sled mechanism 4 which moves the optical pickup 3 in a radial direction of the optical disk 1; and a sled driving circuit 14 which drives the sled mechanism 4.

The optical disk reproducing apparatus further includes: an RF amplifier 5 which receives a reproduction signal from the optical pickup 3 in a process of reproducing the optical disk 1, and which produces an RF (Radio Frequency) signal from the reproduction signal and amplifies the RF signal; a data/synchronization signal separation circuit 6 which receives the RF signal from the RF amplifier 5, and which separates data and a synchronization signal from the RF signal; a PLL 10 including a VCO (Voltage-Controlled Oscillator) which receives the separated synchronization signal to produce a voltage corresponding to the phase difference between the synchronization signal and a predetermined reference signal, and which outputs the voltage as a motor control signal for the spindle motor 2; and a decode circuit 7 which receives and decodes the separated data to perform an error checking process, which, if there is an error, corrects the error to form correct data, and which decodes the correct data to output a video signal and an audio signal.

The optical disk reproducing apparatus further includes: a tracking error detection circuit 8 which detects a tracking error signal contained in the reproduction signal from the optical pickup 3; a focus error detection circuit 11 which detects a focus error signal contained in the reproduction signal from the optical pickup 3; and a track crossing detection circuit 9 which detects a track crossing on the basis of the tracking error signal from the tracking error detection circuit 8, and which outputs a track pulse.

The optical disk reproducing apparatus further includes a control circuit 17 which controls the whole apparatus. The data/synchronization signal separation circuit 6, the tracking error detection circuit 8, the track crossing detection circuit 9, the focus error detection circuit 11, the focus drive circuit 12, the tracking drive circuit 13, the sled driving circuit 14, the spindle motor driving circuit 15, the PLL 10, and a braking control circuit 16 are connected to the control circuit 17.

Figure 5:
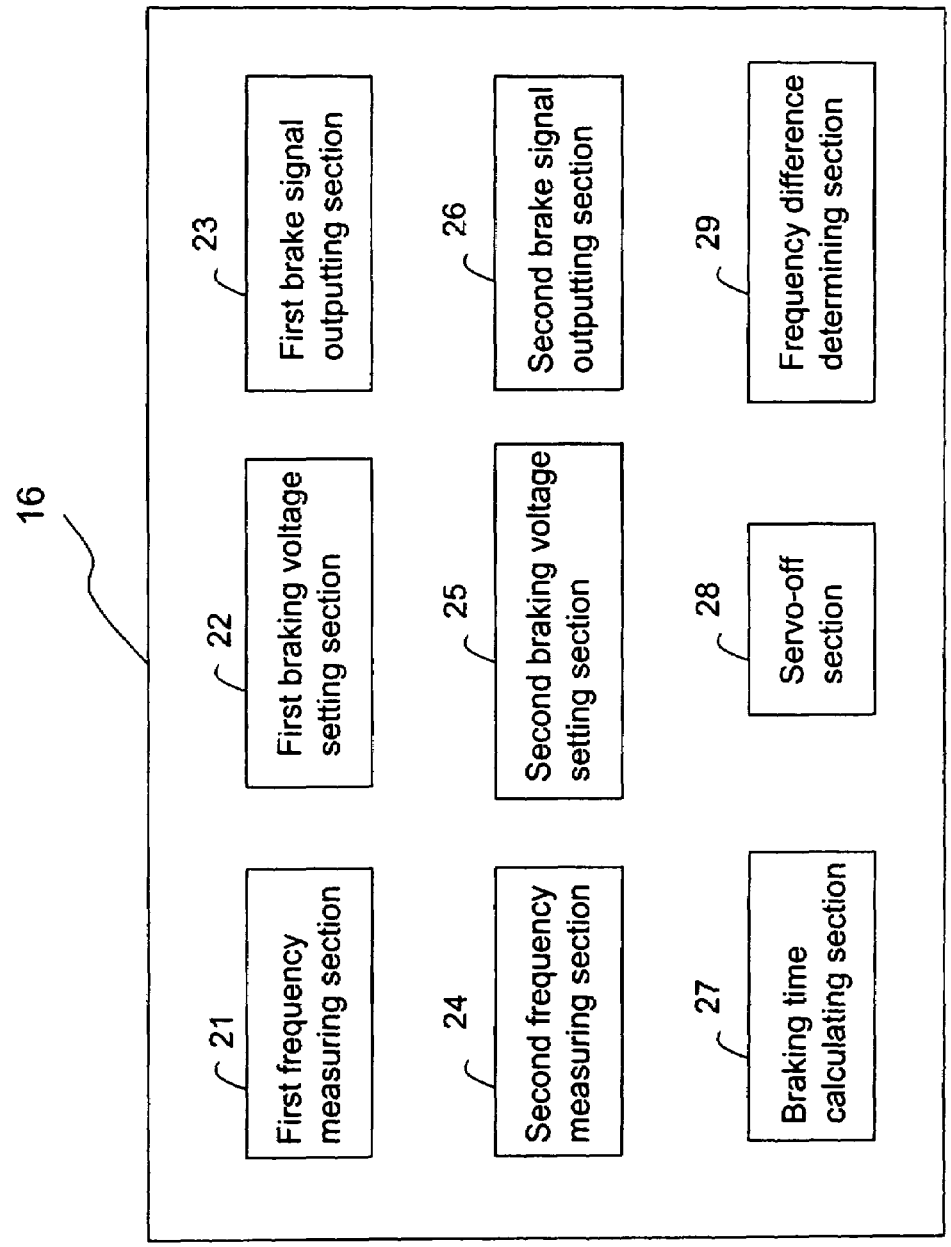
FIG. 5 is a block diagram showing a configuration of a braking control circuit according to an exemplary embodiment of the invention.

The braking control circuit 16 includes: a first frequency measuring section 21 (shown in FIG. 5) which measures the frequency of a read clock signal that is synchronized with the RF signal from the RF amplifier 5, as a first frequency (the frequency before deceleration) in a process of braking the spindle motor 2; a first brake signal outputting section 23 (shown in FIG. 5) which, after the first frequency is measured, outputs a brake signal for applying a brake to the spindle motor 2 for a predetermined time; a second frequency measuring section 24 (shown in FIG. 5) which measures the frequency of the read clock signal after the application of a brake for the predetermined time, as a second frequency (the frequency after deceleration); and a frequency difference determining section 29 (shown in FIG. 5) which determines whether a frequency difference that is obtained by subtracting the second frequency from the first frequency is equal to or larger than a first threshold and equal to or smaller than a second threshold or not.

The braking control circuit 16 further includes: a braking time calculating section 27 (shown in FIG. 5) which, in a case where determined that the frequency difference is equal to or larger than the first threshold and equal to or smaller than the second threshold, calculates the braking time from an expression of {first frequency/(first frequency−second frequency)}*(measuring time from a timing when the first frequency is measured to a timing when the second frequency is measured); a servo-off section 28 (shown in FIG. 5) which, after the braking time is calculated, turns off the whole servo system; and a second brake signal outputting section 26 (shown in FIG. 5) which, after the servo system is turned off, outputs the brake signal to the spindle motor 2 for the calculated braking time.

The braking control circuit 16 further includes: a first braking voltage setting section 22 (shown in FIG. 5) which, in a case where determined that the frequency difference is smaller than the first threshold, sets a braking voltage to a higher level and returns the control to a process of the first frequency measuring section; and a second braking voltage setting section 25 (shown in FIG. 5) which, in a case where determined that the frequency difference is larger than the second threshold, sets the braking voltage to a lower level and returns the control to the process of the first frequency measuring section. Alternatively, the braking control circuit 16 may be included in the control circuit 17.

Figure 2:
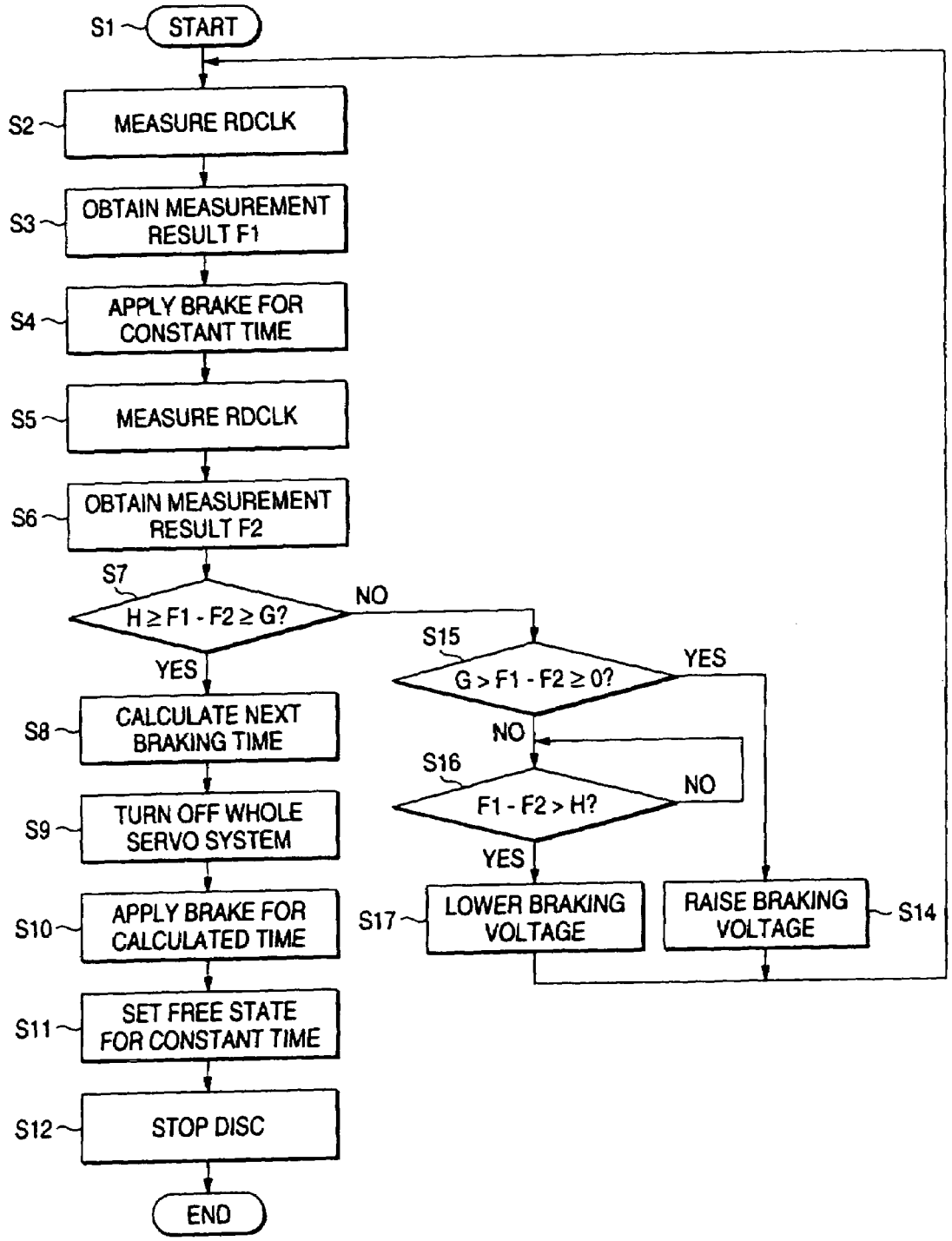
FIG. 2 is a flowchart showing a braking process performed by a braking control circuit in the optical disk reproducing apparatus.
Figure 3:
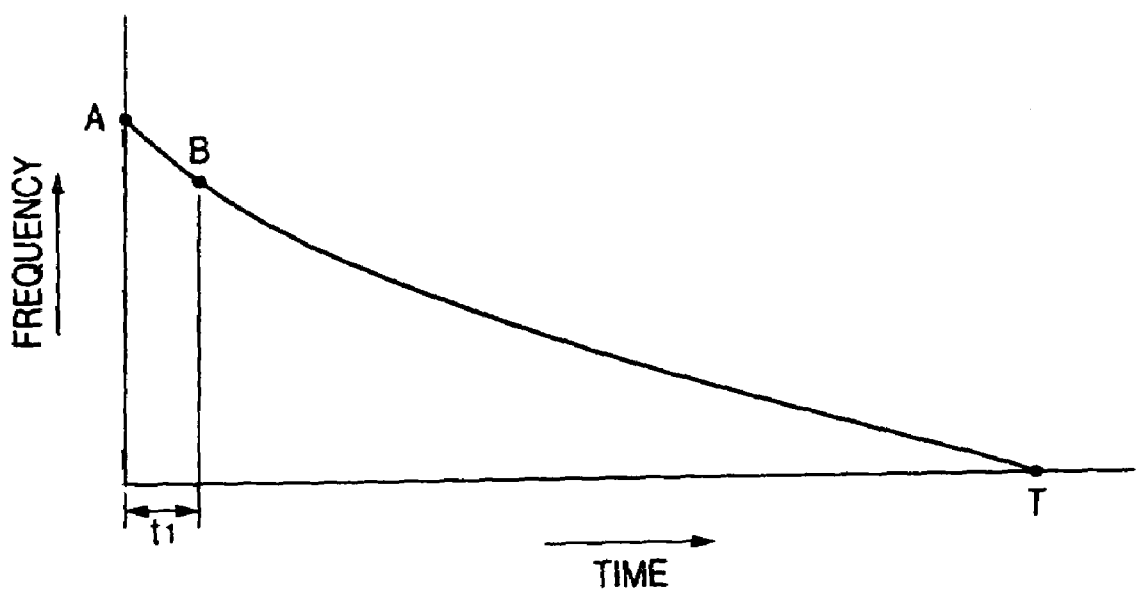
FIG. 3 is a graph showing relationships of the frequency of a read clock signal and the time in the braking process.
Figure 4:
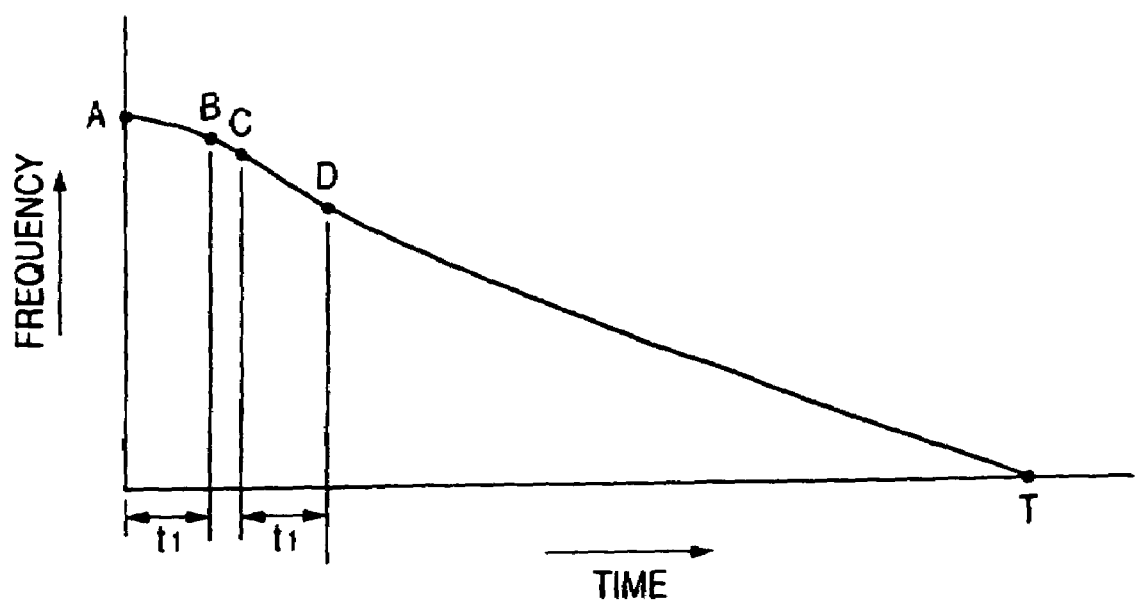
FIG. 4 is a graph showing relationships of the frequency of the read clock signal and the time in the braking process, and particularly illustrating the case where a frequency difference between first and second frequencies is smaller than a first threshold.

FIG. 2 is a flowchart showing a braking process performed by the braking control circuit 16 in the optical disk reproducing apparatus of the embodiment of the invention. FIG. 3 is a graph showing relationships of the frequency of the read clock signal and the time (elapsed time) in the braking process. FIG. 4 is a graph showing relationships of the frequency of the read clock signal and the time in the braking process, and particularly illustrating the case where the frequency difference between the first and second frequencies is smaller than the first threshold. Hereinafter, the braking process performed by the braking control circuit 16 will be described with reference to FIGS. 1 through 4.

When a key such as a reproduction stop key of a remote controller which is not shown, or that of an apparatus main unit is operated, the braking process of stopping the rotation of the optical disk 1 is started (step S1). In the braking process, the frequency of the read clock signal (RDCLK) synchronized with the RF signal which corresponds to the reproduction signal output from the optical pickup 3, and which is output from the RF amplifier 5 is measured as the first frequency by the first frequency measuring section (step S2), to obtain a measurement result F1 (step S3). For example, the measurement result F1 is the frequency at a point A shown in FIG. 3, and indicates the first frequency.

Thereafter, the brake signal for applying a brake to the spindle motor 2 for the predetermined time is output from the first brake signal outputting section, whereby the spindle motor driving circuit 15 is caused to apply the brake signal to the spindle motor 2 for the predetermined time, so that the rotational speed of the optical disk 1 is reduced (step S4). As shown in FIG. 3, for example, the predetermined time results in a predetermined time within the time t1 required for movement from the point A to a point B. When a brake is applied to the spindle motor 2 for a very short predetermined time, the frequency line is inclined, and the frequency is moved from the point A to the point B. The frequency at the point B is measured as the second frequency by the second frequency measuring section (step S5), to obtain a measurement result F2 (step S6). For example, the measurement result F2 is the frequency at the point B shown in FIG. 3, and indicates the second frequency.

The frequency difference determining section then determines whether the frequency difference that is obtained by subtracting the second frequency F2 from the first frequency F1 is equal to or larger than the first threshold G and equal to or smaller than the second threshold H or not (step S7). In a case where the frequency difference is equal to or larger than the first threshold G and equal to or smaller than the second threshold H, the braking time calculating section calculates the braking time from the expression of {first frequency/(first frequency−second frequency)}*(measuring time from a timing when the first frequency is measured to a timing when the second frequency is measured) (step S8). The first and second thresholds G and H are frequency differences between the first and second frequencies F1 and F2 and in the range where, when a brake is applied to the spindle motor 2, the optical disk 1 can be stopped within a predetermined time and is not reversely rotated. The thresholds are experimentally obtained and set.

After the braking time is calculated, the servo-off section turns off the whole servo system (the feedback control system) (step S9), and the second brake signal outputting section outputs the brake signal for only the calculated braking time, so that the spindle motor driving circuit 15 applies the brake signal to the spindle motor 2 for the braking time (step S10).

The spindle motor 2 is then set to a free state for a predetermined time (step S11), and the rotational speed of the optical disk 1 is reduced. In accordance with this reduction, as shown in FIG. 3, the frequency of the read clock signal is reduced to become zero after an elapse of a time T, or the rotation of the optical disk 1 is stopped (step S12), thereby completing the braking process. It can be known whether the optical disk 1 is stopped or not, by detecting whether the frequency of the read clock signal becomes zero or not.

In a case where the judgment whether the frequency difference that is obtained by subtracting the second frequency F2 from the first frequency F1 is equal to or larger than the first threshold G and equal to or smaller than the second threshold H or not (step S7), it is determined that the frequency difference is not in the range from the first threshold G or larger to the second threshold H or smaller, and it is further determined that the frequency difference is smaller than the first threshold G (step S15), a braking voltage which is higher than the present braking voltage is set by the first braking voltage setting section (step S14).

The higher braking voltage is set for the following reason. When a brake is applied for the first predetermined time t1 as shown in FIG. 4, for example, the frequency is reduced from the point A to the point B. In the case where the frequency difference is considerably small, the time T to elapse before the rotation of the optical disk 1 is stopped is prolonged. Therefore, a brake which is higher in degree than that at the first time is applied for the second predetermined time t1 to enhance the reduction rate as indicated by the points C and D, thereby enabling the rotation of the optical disk 1 to be stopped after an elapse of the time T.

After the braking voltage is set to a higher level as described above, the frequency of the read clock signal (RDCLK) synchronized with the RF signal which corresponds to the reproduction signal output from the optical pickup 3, and which is output from the RF amplifier 5 is measured as the first frequency by the first frequency measuring section (step S2), to obtain a new measurement result F1 (step S3). For example, the measurement result F1 is the frequency at the point C shown in FIG. 4, and indicates the new first frequency.

Thereafter, the brake signal for applying a brake to the spindle motor 2 for the predetermined time is output from the first brake signal outputting section, whereby the spindle motor driving circuit 15 is caused to apply the brake signal to the spindle motor 2 for the predetermined time, so that the rotational speed of the optical disk 1 is reduced (step S4). As shown in FIG. 4, for example, the predetermined time results in a predetermined time within the time t1 required for movement from the point C to a point D. When a brake is applied to the spindle motor 2 for a very short predetermined time, the frequency line is inclined, and the frequency is moved from the point C to the point D. The frequency at the point D is measured as a new second frequency by the second frequency measuring section (step S5), to obtain a new measurement result F2 (step S6). For example, the measurement result F2 is the frequency at the point D shown in FIG. 4, and indicates the new second frequency.

The frequency difference determining section then determines whether the frequency difference that is obtained by subtracting the second frequency F2 from the first frequency F1 is equal to or larger than the first threshold G and equal to or smaller than the second threshold H or not (step S7). In a case where determined that the frequency difference is equal to or larger than the first threshold G and equal to or smaller than the second threshold H, the braking time calculating section calculates the braking time from the expression of {first frequency/(first frequency−second frequency)}*(measuring time from a timing when the first frequency is measured to a timing when the second frequency is measured) (step S8).

After the braking time is calculated, the servo-off section turns off the whole servo system (step S9), and the second brake signal outputting section outputs the brake signal for only the calculated braking time, so that the spindle motor driving circuit 15 applies the brake signal to the spindle motor 2 for the braking time (step S10).

The spindle motor 2 is then set to a free state for a predetermined time (step S11), and the rotational speed of the optical disk 1 is reduced. In accordance with this reduction, as shown in FIG. 4, the frequency of the read clock signal is reduced to become zero after an elapse of a time T, or the rotation of the optical disk 1 is stopped (step S12), thereby completing the braking process.

In a case where determined that the frequency difference is larger than the second threshold H (step S16) a braking voltage which is lower than the present braking voltage is set by the second braking voltage setting section (step S17).

The lower braking voltage is set for the following reason. In the case where, when a brake is applied for the first predetermined time in the state of a higher braking voltage, the frequency difference is considerably large, the time T to elapse before the rotation of the optical disk 1 is stopped is shortened, and the brake is applied so excessively that there arises the possibility that the spindle motor 2 reversely rotates. Therefore, a brake which is lower in degree than that at the first time is applied for the second predetermined time to reduce the frequency reduction rate as compared with the former one, thereby enabling the rotation of the optical disk 1 to be stopped after an elapse of the time T.

After the braking voltage is set to a lower level as described above, the frequency of the read clock signal (RDCLK) synchronized with the RF signal which corresponds to the reproduction signal output from the optical pickup 3, and which is output from the RF amplifier 5 is measured as a new first frequency by the first frequency measuring section (step S2), and the same process as described above is then performed.

As described above, according to the invention, the time of supplying the brake signal to the spindle motor 2 is calculated on the basis of the frequency of the read clock signal synchronized with the RF signal from the RF amplifier 5, and the rotation of the optical disk 1 is then stopped. Unlike the conventional art, therefore, the rotation of the optical disk can be stopped without necessity of disposing an FG sensor. Consequently, the production cost and size of the apparatus can be reduced in accordance with no need of an FG sensor.

As described above, according to the invention, the time of supplying the brake signal to the spindle motor can be calculated on the basis of the frequency of the read clock signal synchronized with the RF signal. Therefore, unlike the conventional art, the rotation of the optical disk can be stopped without the necessity of disposing an FG sensor, and hence the production cost and size of the apparatus can be reduced in accordance with no need of an FG sensor.

According to the invention, the production cost and size of the apparatus can be reduced in accordance with no need of an FG sensor.

According to the invention, the time of supplying the brake signal to the spindle motor can be calculated on the basis of the frequency of the read clock signal synchronized with the RF signal.

According to the invention, the braking voltage is set to a higher level in a case where determined that the frequency difference is smaller than the first threshold. Therefore, the rotational speed reduction rate of the spindle motor can be set to be higher than the former one. In a case where the frequency difference between the first and second frequencies which are measured at the first time is smaller than the first threshold, and not within the range which is equal to or larger than the first threshold and equal to or smaller than the second threshold, the braking voltage is set to a higher level, thereby producing the possibility that the frequency difference between the first and second frequencies which are measured at the second time is within the range which is equal to or larger than the first threshold and equal to or smaller than the second threshold. When the frequency difference is within the range, the braking time can be calculated from the expression of {first frequency/(first frequency−second frequency)}*(measuring time from the timing when the first frequency is measured to that when the second frequency is measured).

According to the invention, the rotational speed reduction rate of the spindle motor can be set to be lower than the former one. In a case where the frequency difference between the first and second frequencies which are measured at the first time is larger than the second threshold, and not within the range which is equal to or larger than the first threshold and equal to or smaller than the second threshold, the braking voltage is set to a lower level, thereby producing the possibility that the frequency difference between the first and second frequencies which are measured at the second time is within the range which is equal to or larger than the first threshold and equal to or smaller than the second threshold. When the frequency difference is within the range, the braking time can be calculated from the expression of {first frequency/(first frequency−second frequency)}*(measuring time from the timing when the first frequency is measured to that when the second frequency is measured).

According to the invention, the frequency of the read clock signal that is synchronized with the RF signal corresponding to the reproduction signal is measured as the first frequency in the process of braking the spindle motor. Thereafter, a brake is applied to the spindle motor for the predetermined time, and the frequency of the clock signal is then measured as the second frequency.

Thereafter, it is determined whether the frequency difference that is obtained by subtracting the second frequency from the first frequency is equal to or larger than the first threshold and equal to or smaller than the second threshold or not. In a case where determined that the frequency difference is equal to or larger than the first threshold and equal to or smaller than the second threshold, the braking time is calculated from the expression of {first frequency/(first frequency−second frequency)}*(measuring time from the timing when the first frequency is measured to that when the second frequency is measured). After the braking time is calculated, the whole servo system is turned off, and the brake signal is output to the spindle motor for the calculated braking time. As a result, the spindle motor is braked, and the rotation of the optical disk is stopped.

In a case where determined that the frequency difference is smaller than the first threshold, the braking voltage is set to a higher level. Thereafter, the frequency is again measured as the first frequency, and the spindle motor is then braked for the predetermined time by the braking voltage which has been set to the higher level. The frequency is again measured as the second frequency, and the same process as described above is then performed. In a case where determined that the frequency difference is larger than the second threshold, the braking voltage is set to a lower level. Thereafter, the frequency is again measured as the first frequency, and the spindle motor is then braked for the predetermined time by the braking voltage which has been set to the lower level. The frequency is again measured as the second frequency, and the same process as described above is then performed.

As described above, according to the invention, the time of supplying the brake signal to the spindle motor is calculated on the basis of the frequency of the read clock signal synchronized with the RF signal, and the rotation of the optical disk is then stopped. Unlike the conventional art, therefore, the rotation of the optical disk can be stopped without necessity of disposing an FG sensor. Consequently, the production cost and size of the apparatus can be reduced in accordance with no need of an FG sensor.

According to the invention, the frequency of the read clock signal that is synchronized with the RF signal corresponding to the reproduction signal is measured as the first frequency in the process of braking the spindle motor. Thereafter, a brake is applied to the spindle motor for the predetermined time, and the frequency of the clock signal is then measured as the second frequency.

Thereafter, the braking time is calculated on the basis of: the frequency difference that is obtained by subtracting the second frequency from the first frequency; the first frequency; and the measuring time from the timing when the first frequency is measured to that when the second frequency is measured. Then, the whole servo system is turned off and the brake signal is output to the spindle motor for the calculated braking time.

As described above, according to the invention, the time of supplying the brake signal to the spindle motor is calculated on the basis of the frequency of the read clock signal synchronized with the RF signal, and the rotation of the optical disk is then stopped. Unlike the conventional art, therefore, the optical disk can be stopped without necessity of disposing an FG sensor. Consequently, the production cost and size of the apparatus can be reduced in accordance with no need of an FG sensor.

According to the invention, the frequency of the read clock signal that is synchronized with the RF signal corresponding to the reproduction signal is measured as the first frequency in the process of braking the spindle motor. Thereafter, a brake is applied to the spindle motor for the predetermined time, and the frequency of the clock signal is then measured as the second frequency.

Thereafter, it is determined whether the frequency difference that is obtained by subtracting the second frequency from the first frequency is equal to or larger than the first threshold and equal to or smaller than the second threshold or not. In a case where determined that the frequency difference is equal to or larger than the first threshold and equal to or smaller than the second threshold, the braking time is calculated from the expression of {first frequency/(first frequency−second frequency)}*(measuring time from the timing when the first frequency is measured to that when the second frequency is measured). After the braking time is calculated, the whole servo system is turned off, and the brake signal is output to the spindle motor for the calculated braking time. As a result, the spindle motor is braked, and the rotation of the optical disk is stopped.

According to the invention, in a case where determined that the frequency difference is smaller than the first threshold, the braking voltage is set to a higher level. Therefore, the rotational speed reduction rate of the spindle motor can be set to be higher than the former one. After the braking voltage is set to a higher level, the frequency is again measured as the first frequency, and the same process as described above is then performed. Namely, in a case where the frequency difference between the first and second frequencies which are measured at the first time is smaller than the first threshold, and not within the range which is equal to or larger than the first threshold and equal to or smaller than the second threshold, the braking voltage is set to a higher level, thereby producing the possibility that the frequency difference between the first and second frequencies which are measured at the second time is within the range which is equal to or larger than the first threshold and equal to or smaller than the second threshold. When the frequency difference is within the range, the braking time is calculated from the expression of {first frequency/(first frequency−second frequency)}*(measuring time from the timing when the first frequency is measured to that when the second frequency is measured).

According to the invention, in a case where determined that the frequency difference is larger than the second threshold, the braking voltage is set to a lower level. Therefore, the rotational speed reduction rate of the spindle motor can be set to be lower than the former one. After the braking voltage is set to a lower level, the frequency is again measured as the first frequency, and the same process as described above is then performed. Namely, in a case where the frequency difference between the first and second frequencies which are measured at the first time is larger than the second threshold, and not within the range which is equal to or larger than the first threshold and equal to or smaller than the second threshold, the braking voltage is set to a lower level, thereby producing the possibility that the frequency difference between the first and second frequencies which are measured at the second time is within the range which is equal to or larger than the first threshold and equal to or smaller than the second threshold. When the frequency difference is within the range, the braking time is calculated from the expression of {first frequency/(first frequency−second frequency)}*(measuring time from the timing when the first frequency is measured to that when the second frequency is measured).

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk reproducing apparatus including: a spindle motor configured to rotate an optical disk; an optical pickup configured to emit a laser beam onto the optical disk and to receive light reflected from the optical disk for reproducing information recorded on the optical disk; and a spindle motor controller configured to control the spindle motor on the basis of a synchronization signal contained in a reproduction signal output from the optical pickup in a reproduction process, the apparatus comprising:
    a braking control circuit which comprises:
    a first frequency measuring section configured to measure a frequency of a read clock signal that is synchronized with an RF signal corresponding to the reproduction signal, as a first frequency in a process of braking the spindle motor;
    a first brake signal outputting section configured to output a brake signal for applying a brake to the spindle motor for a predetermined time, after the first frequency is measured;
    a second frequency measuring section configured to measure the frequency of the read clock signal after the brake is applied for the predetermined time, as a second frequency;
    a frequency difference determining section configured to determine whether or not a frequency difference obtained by subtracting the second frequency from the first frequency is equal to or larger than a first threshold and equal to or smaller than a second threshold;
    a braking time calculating section configured to calculate a braking time from an expression of {the first frequency/(the first frequency−the second frequency)}*(a measuring time from a timing when the first frequency is measured to a timing when the second frequency is measured), in a case where determined that the frequency difference is equal to or larger than the first threshold and equal to or smaller than the second threshold;
    a servo-off section configured to turn off a servo system of the spindle motor, after the braking time is calculated;
    a second brake signal outputting section configured to output a brake signal to the spindle motor for the calculated braking time, after the servo system is turned off;
    a first braking voltage setting section configured to set a braking voltage to a higher level and returns a control to a process of the first frequency measuring section, in a case where determined that the frequency difference is smaller than the first threshold; and
    a second braking voltage setting section configured to set the braking voltage to a lower level and returns the control to the process of the first frequency measuring section, in a case where determined that the frequency difference is larger than the second threshold.

2. An optical disk reproducing apparatus including: a spindle motor configured to rotate an optical disk; an optical pickup configured to emit a laser beam onto the optical disk and to receive light reflected from the optical disk for reproducing information recorded on the optical disk; and a spindle motor controller configured to control the spindle motor on the basis of a synchronization signal contained in a reproduction signal output from the optical pickup in a reproduction process, the apparatus comprising:
    a braking control circuit configured to measure a frequency of a read clock signal that is synchronized with an RF signal corresponding to the reproduction signal, as a first frequency in a process of braking the spindle motor; to measure the frequency of the read clock signal after a brake is applied to the spindle motor for a predetermined time after the first frequency is measured, as a second frequency; to calculate a braking time on the basis of a frequency difference obtained by subtracting the second frequency from the first frequency, the first frequency and a measuring time from a timing when the first frequency is measured to a timing when the second frequency is measured; and, after the braking time is calculated, to turn off a servo system of the spindle motor and to output a brake signal to the spindle motor for the calculated braking time.

3. The optical disk reproducing apparatus as claimed in claim 2, wherein the braking control circuit comprises:
    a first frequency measuring section configured to measure the frequency of the read clock signal that is synchronized with the RF signal corresponding to the reproduction signal, as the first frequency in the process of braking the spindle motor;
    a first brake signal outputting section configured to output the brake signal for applying a brake to the spindle motor for the predetermined time, after the first frequency is measured;
    a second frequency measuring section configured to measure the frequency of the read clock signal after the brake is applied for the predetermined time, as a second frequency;
    a frequency difference determining section configured to determine whether or not the frequency difference obtained by subtracting the second frequency from the first frequency is equal to or larger than a first threshold and equal to or smaller than a second threshold;
    a braking time calculating section configured to calculate the braking time from an expression of {the first frequency/(the first frequency−the second frequency)}*(the measuring time from a timing when the first frequency is measured to a timing when the second frequency is measured), in a case where determined that the frequency difference is equal to or larger than the first threshold and equal to or smaller than the second threshold;

a servo-off section configured to turn off the servo system of the spindle motor, after the braking time is calculated; and a second brake signal outputting section configured to output the brake signal to the spindle motor for the calculated braking time, after the servo system is turned off.

4. The optical disk reproducing apparatus as claimed in claim 3, wherein the braking control circuit further comprises a first braking voltage setting section configured to set a braking voltage to a higher level and returns a control to a process of the first frequency measuring section, in a case where determined that the frequency difference is smaller than the first threshold.

5. The optical disk reproducing apparatus as claimed in claim 3, wherein the braking control circuit further comprises a second braking voltage setting section configured to set a braking voltage to a lower level and returns the control to the process of the first frequency measuring section, in a case where determined that the frequency difference is larger than the second threshold.

6. A method for controlling a spindle motor in which rotates an optical disk, comprising:

measuring a frequency of a read clock signal that is synchronized with an RF signal corresponding to a reproduction signal obtained by reproducing the optical disk, as a first frequency in a process of braking the spindle motor;

outputting a brake signal for applying a brake to the spindle motor for a predetermined time, after the first frequency is measured;

measuring the frequency of the read clock signal after the brake is applied for the predetermined time, as a second frequency;

determining whether or not a frequency difference obtained by subtracting the second frequency from the first frequency is equal to or larger than a first threshold and equal to or smaller than a second threshold;

calculating a braking time from an expression of {the first frequency/(the first frequency−the second frequency)}*(a measuring time from a timing when the first frequency is measured to a timing when the second frequency is measured), in a case where determined that the frequency difference is equal to or larger than the first threshold and equal to or smaller than the second threshold;

turning off a servo system of the spindle motor, after the braking time is calculated; and outputting the brake signal to the spindle motor for the calculated braking time, after the servo system is turned off.

7. The method as claimed in claim 6 further comprising setting a braking voltage to a higher level and returns to the measuring of the first frequency, in a case where determined that the frequency difference is smaller than the first threshold.

8. The method as claimed in claim 6 further comprising setting a braking voltage to a lower level and returns to the measuring of the first frequency, in a case where determined that the frequency difference is larger than the second threshold.

* * * * *